US007765464B2

(12) United States Patent
Bokor

(10) Patent No.: US 7,765,464 B2
(45) Date of Patent: Jul. 27, 2010

(54) METHOD AND SYSTEM FOR DYNAMICALLY ASSEMBLING PRESENTATIONS OF WEB PAGES

(75) Inventor: Brian Ronald Bokor, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 867 days.

(21) Appl. No.: 11/622,617

(22) Filed: Jan. 12, 2007

(65) Prior Publication Data

US 2008/0172600 A1 Jul. 17, 2008

(51) Int. Cl.
*G06F 15/00* (2006.01)
*G06F 7/00* (2006.01)
*G06F 17/20* (2006.01)

(52) U.S. Cl. .................. 715/204; 715/201; 715/234; 715/239; 715/249; 707/3; 707/102; 704/8; 704/10

(58) Field of Classification Search ......... 715/200–204, 715/209, 234, 236, 239, 243, 249, 255, 264, 715/273, 760, 762; 707/1, 3, 4, 10, 100, 707/102, 200; 704/1, 5, 7–9, 203, 257, 277
See application file for complete search history.

(56) References Cited

U.S. PATENT DOCUMENTS

| | | | |
|---|---|---|---|
| 5,890,175 A | 3/1999 | Wong et al. | |
| 5,987,480 A | 11/1999 | Donohue et al. | |
| 6,108,673 A | 8/2000 | Brandt et al. | |
| 6,161,112 A * | 12/2000 | Cragun et al. | 715/251 |
| 6,219,680 B1 | 4/2001 | Bernardo et al. | |
| 6,779,153 B1 | 8/2004 | Kagle | |
| 6,804,816 B1 | 10/2004 | Liu et al. | |
| 6,832,351 B1 | 12/2004 | Batres | |

(Continued)

FOREIGN PATENT DOCUMENTS

GB 2373085 A * 9/2002

(Continued)

OTHER PUBLICATIONS

Court et al., Mastering Microsoft Office 2000 Professinal Edition, Copyright 1999, SYBEX Inc., pp. 355-374 and 955-981.*

(Continued)

*Primary Examiner*—Laurie Ries
*Assistant Examiner*—Maikhanh Nguyen
(74) *Attorney, Agent, or Firm*—Schmeiser, Olsen & Watts; John R. Pivnichny

(57) ABSTRACT

A web designer defines attributes including business rules, properties and standard user interface library components. These attribute definitions allow look and feel specifications of a web page to be dynamically changed without requiring code modifications to any web application. A presentation assembly engine (PAE) receives a Uniform Resource Locator of a web page along with associated attributes and generates a unique identifier associated with a request of the web page. The PAE receives from a web application a web page request that includes the associated unique identifier. The PAE utilizes the unique identifier to identify and access the attributes needed to assemble a presentation of the web page. The PAE uses the attributes to assemble the web page presentation and sends the completed page to the web application.

16 Claims, 10 Drawing Sheets

U.S. PATENT DOCUMENTS

| | | | |
|---|---|---|---|
| 6,854,120 B1 | 2/2005 | Lo et al. | |
| 6,910,045 B2 | 6/2005 | Hickey et al. | |
| 6,944,817 B1* | 9/2005 | Danneels | 715/207 |
| 7,047,041 B2 | 5/2006 | Vanska et al. | |
| 7,047,318 B1 | 5/2006 | Svedloff | |
| 7,058,671 B2* | 6/2006 | Calvo et al. | 715/205 |
| 7,191,393 B1* | 3/2007 | Chin et al. | 715/205 |
| 7,284,199 B2* | 10/2007 | Parasnis et al. | 715/201 |
| 7,293,034 B2* | 11/2007 | Paya et al. | 707/1 |
| 2002/0161802 A1* | 10/2002 | Gabrick et al. | 707/517 |
| 2004/0015476 A1* | 1/2004 | Twaddle | 707/1 |
| 2005/0076291 A1* | 4/2005 | Yee et al. | 715/513 |

FOREIGN PATENT DOCUMENTS

| | | |
|---|---|---|
| JP | 2001125855 A | 5/2001 |
| WO | WO 02/01386 A1 | 1/2002 |

OTHER PUBLICATIONS

W3C: "XSL Transformation (XSLT)", XP002189938, Nov. 16, 1999, 11 pages.*

J. Chae et al., "XSLT Template Design for Generating the Web Presentation Layer", IEEE, 2003, 9 pages.*

Bos et a., "Cascading Style Sheets, Level 2, CSSS Specification, W3C Recommendation", May 12, 1998, Chapter 2, 30 pages.*

* cited by examiner

```
<table width="150" cellspacing="0" cellpadding="0" border="0">
#LOOP THROUGH FOR AMOUNT OF LINKS
<tr>
<td colspan="2" class="$LINK_SELECTED">
<a href="$LINK_URL" class="$LINK_SELECTED">$LINK TEXT</a>
</td>
</tr>
#END LOOP
</table>
<br class="break" />
```

```
<templateproperties>
  <layouts>
    <layout name="ONE_COLUMN_LAYOUT" value="oneColumnLayout.template" />
    <layout name="TWO_COLUMN_LAYOUT" value="twoColumnLayout.template" />
    <layout name="THREE_COLUMN_LAYOUT" value="threeColumnLayout.template" />
  </layouts>
  <styles name="IBM_COM" value="ibm.com.style.template" />
  <templates>
    <template name="RIGHT_NAV_TEMPLATE" value=right.nav.template" />
  </templates>
</templateproperties>
```

*FIG. 6*

```
<pages language="EN" country="US"

<properties name="TITLE" value="Support & Downloads" />
    <properties name="LAYOUT" value="THREE_COLUMN_LAYOUT" />
    <properties name="STYLE" value="IBM_COM" />
    <layout>
        <column value="1">
            <template value="LEFT_NAV_TEMPLATE" />
            <template value="RELATED_LINKS_TEMPLATE" />
        </column>
        <column value="2" picture="http://www.ibm.com/us/support.gif">
            <template value="SEARCH_TEMPLATE" />
            <template value="OTHER_INFO" />
        </column>
        <column value="3">
            <  template value="RIGHT_NAV_TEMPLATE" />
        </column>
    </layout>

<properties name="TITLE" value="Software Tech Notes" />
    <properties name="LAYOUT" value="ONE_COLUMN_LAYOUT" />
    <properties name="STYLE" value=INTERNAL_IBM_COM" />

</pages>
```

```
<pages>

</pages>
```

```
pageAction(X_123_SUPPORT_DOWNLOAD);

HtmlForClientDelivery htmlForPage;

public String pageAction(String pageIdentifier){
    String tempForwardPage = null;
    ArrayList leftNavLinks = getLeftNavLinks();
    try {
        sendContent(pageIdentifier, LEFT_NAV, leftNavLinks);
        sendContent(pageIdentifier, RIGHT_NAV, rightNavLinks);
    }catch(SendingException e){
        Log.error(e);
        tempForwardPage -"error.page";
    }
    if(tempForwardPage == null){
        htmlForPage = receiveContentFromAlgorithmApp(pageIdentifier);
        tempForwardPage = "render.page";
    }
    return tempForwardPage;
} public ArrayList getLeftNavLinks(){
    ArrayList returnList = new ArrayList();
    LeftNavLinks tempLink = new LeftNavLinks();
    Vector tempVec = getLinksFromDatabase();
    for(int x=0; x< tempVec.size(); x++;) {
        tempLink = (LeftNavLinks)tempVec.get(x);
        temp.setLink(tempLink.getText(), tempLink.getURL());
        returnList.add(temp);
    }
    return returnList;
}
```

*FIG. 9*

METHOD AND SYSTEM FOR DYNAMICALLY ASSEMBLING PRESENTATIONS OF WEB PAGES

FIELD OF THE INVENTION

The present invention relates to a method and system for dynamically assembling presentations of web pages, and more particularly to a technique for employing a web services engine and business rules to dynamically construct updated presentations of hypertext markup language (HTML) web pages.

BACKGROUND OF THE INVENTION

Conventional web development processes require mechanisms such as JavaServer® Pages (JSP®), servlets, etc., to allow generation of HTML web pages. Even if templates are used to separate content, these known web development techniques require that HTML components be developed repeatedly, thereby driving up development costs. Further, when changes to business requirements dictate modifications to HTML pages relative to multiple custom web applications, additional development costs are incurred. In response to such changes to business requirements, multiple developers associated with the multiple custom web applications must manually change all pertinent web pages. Thus, there exists a need to overcome at least one of the preceding deficiencies and limitations of the related art.

SUMMARY OF THE INVENTION

The present invention provides a computer-based method of dynamically assembling presentations of web pages, the method comprising:

defining a plurality of attributes for facilitating presentations of a plurality of web pages associated with a plurality of custom web applications (CWAs) in a many-to-one correspondence, the plurality of attributes including a plurality of business rules, a plurality of properties and a plurality of standard user interface (UI) library components, wherein the defining is performed without adding code to or modifying code in any custom web application of the plurality of CWAs;

receiving, at a presentation assembly engine (PAE) of a computing system and from a custom web application (CWA) of the plurality of CWAs, a page request for a web page of the plurality of web pages, the page request including a unique identifier associated with the web page, and the page request being initiated by an initial web page request from a browser; and assembling the web page, the assembling performed by the PAE in response to the receiving the page request, the assembling including utilizing the unique identifier to identify one or more attributes of the plurality of attributes, and utilizing the one or more attributes to assemble a presentation of the web page.

A system, computer program product, and process for supporting computing infrastructure corresponding to the above-summarized method are also described and claimed herein.

Advantageously, the present invention provides a presentation assembly engine that accesses dynamically generated properties, business rules and template content for the assembly of a web page so that the business process of look and feel design is separated from web page development tasks. Further, the present invention allows a web developer to avoid: (1) consulting look and feel standards, (2) being concerned with mechanisms to manually construct web pages, and (3) writing HTML look and feel components. Instead, the web developer's tasks are focused on data specific to a web application and the retrieval of certain information from databases.

BRIEF DESCRIPTION OF THE DRAWINGS

FIG. 5 is an example of a template entered during the process of FIG. 2, in accordance with embodiments of the present invention.

FIG. 6 is an example of template properties that are entered during the process of FIG. 2, in accordance with embodiments of the present invention.

FIG. 7 is an example of web page information submitted by a custom web application to a presentation assembly engine during the process of FIG. 2, in accordance with embodiments of the present invention.

FIG. 8 is an example of unique identifiers generated by the presentation assembly engine during the process of FIG. 2, in accordance with embodiments of the present invention.

FIG. 9 is an example of query calls made by the custom web application to the presentation assembly engine, in accordance with embodiments of the present invention.

DETAILED DESCRIPTION OF THE INVENTION

The present invention provides a rules-based approach for dynamically assembling presentations of web pages subsequent to dynamic and centralized updates of look and feel specifications related to the design of the web pages. The dynamic updates of look and feel specifications (e.g., HTML components) are separated from the coding tasks of normal web development. The assembly of the web page presentations utilize dynamically generated HTML content that is accessed via web services.

System for Dynamically Constructing Web Pages

Figure 1:
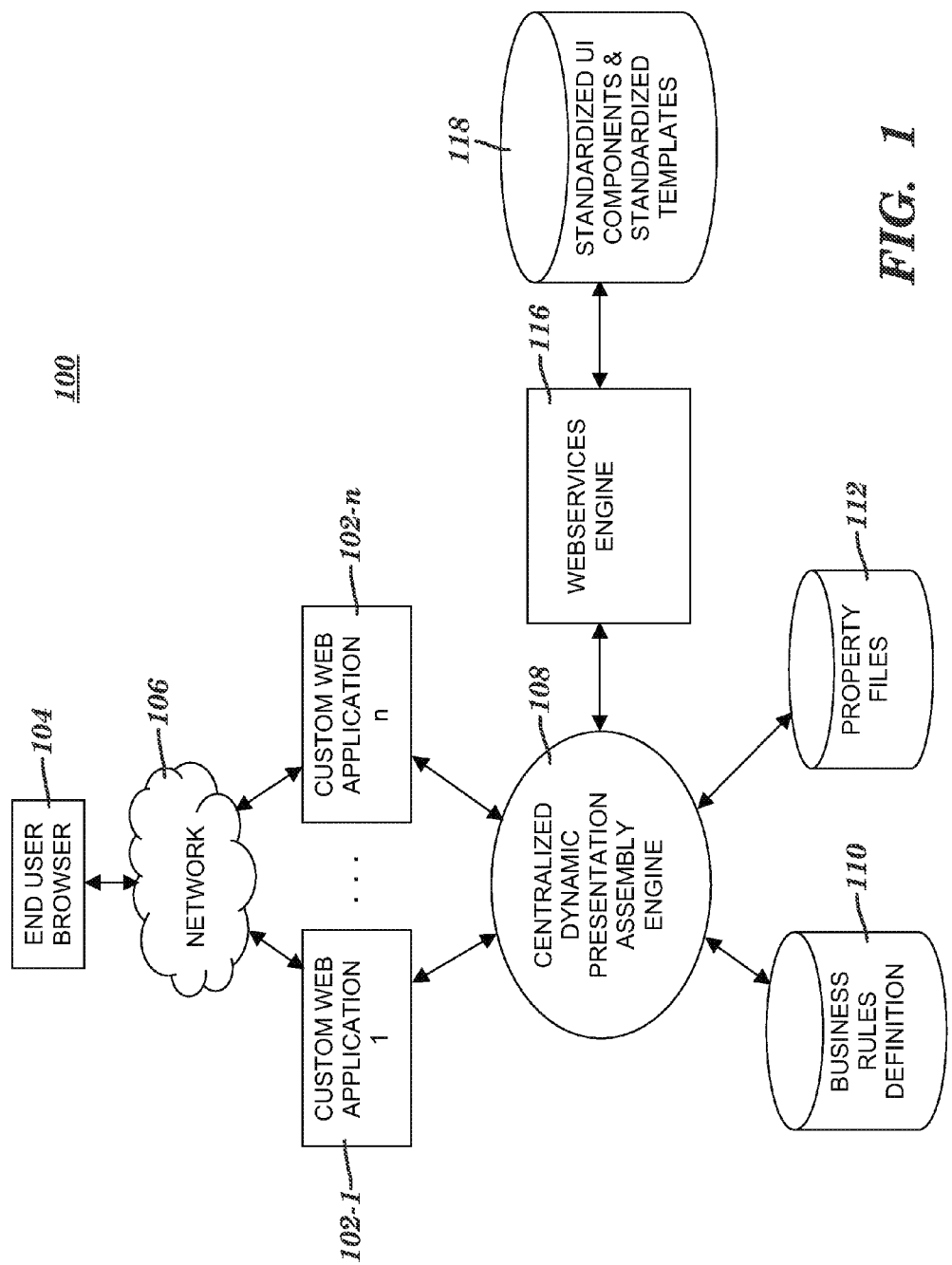
FIG. 1 is a block diagram of a system for dynamically constructing web pages, in accordance with embodiments of the present invention.

FIG. 1 is a block diagram of a system for dynamically constructing web pages, in accordance with embodiments of the present invention. System 100 includes a plurality of custom web applications 102-1, . . . , 102-n in communication with an end user's browser 104 via a network 106 (e.g., intranet or Internet). Each custom web application is associated with one or more web pages that can be requested by browser 104. System 100 also includes a centralized dynamic presentation assembly engine 108 that processes queries sent from custom web applications 102-1, . . . , 102-n via a network (not shown). Hereinafter, the centralized dynamic presentation assembly engine 108 is also referred to as the presentation assembly engine or PAE. PAE 108 is coupled to a business rules definition database 110, a property files database 112 and a web services engine 116. Web services engine 116 is coupled to a database storing standardized user interface (UI) components and standardized templates 118. Hereinafter, standardized UI components and standardized templates 118 are collectively referred to as standard user interface library components.

A standardized template (a.k.a. web template or template) in database 118 is a web page design tool that includes presentation specifications that are used to customize the look and feel of a web page. A template is included in, for example, a HTML, eXtensible Markup Language (XML), eXtensible Stylesheet Language (XSL) or text document. The presentation specifications included in a template are related to, for instance, web page layout, website navigability, and web page structure. Templates are capable of being dynamically updated and are defined differently per custom web application or per client.

A standardized UI component included in database 118 includes presentation specification(s) that are used to customize the look and feel of a portion of a web page (e.g., the header or footer of a web page). Similar to a template, a standardized UI component is included in, for example, a HTML, XML, XSL or text document.

Property files database 112 includes properties defined for each standardized template or standardized UI component in database 118. As used herein, properties are layout specifications that are to be used to assemble a web page. Properties are included in, for example, XML documents. The present invention allows properties to be updated dynamically so that a subsequent request for a web page results in the assembly of a web page presentation that utilizes the layout specifications in the updated properties. In one embodiment, properties are updated by web designers or UI designers instead of web developers (i.e., outside of normal web development), and these property updates do not require any additions to or modifications of the code of any custom web application. Further, these property updates do not require a modification to any database record managed by a custom web application.

Business rules definition database 110 includes business rules (a.k.a. rules) that determine which properties apply to the assembly of a particular web page presentation. Rules can, for instance, change the presentation of a web page based on variations in laws from country to country or state to state. For example, a rule is provided by the value of a country code associated with a web page request. In this example, if the country code indicates the United States, then properties X, Y and Z apply to the layout of the footer of the requested web page, and if the country code indicates Canada, then only properties M and N apply to the same layout. The present invention allows business rules to be updated dynamically so that a subsequent request for a web page results in the assembly of a web page presentation based on the updated rule. In one embodiment, rules are updated by web designers or UI designers instead of web developers (i.e., outside of normal web development), and these rule updates do not require any additions to or modifications of the code of any custom web application. Further, these rule updates do not require a modification to any database record managed by a custom web application.

In one embodiment, PAE 108 resides on a first computing system and the custom web applications 102-1, . . . , 102-*n* reside on other computing systems. In one embodiment, web services engine 116 resides on a computing system that is different from the computing system that includes PAE 108.

Dynamic Web Page Assembly Process

Figure 2:
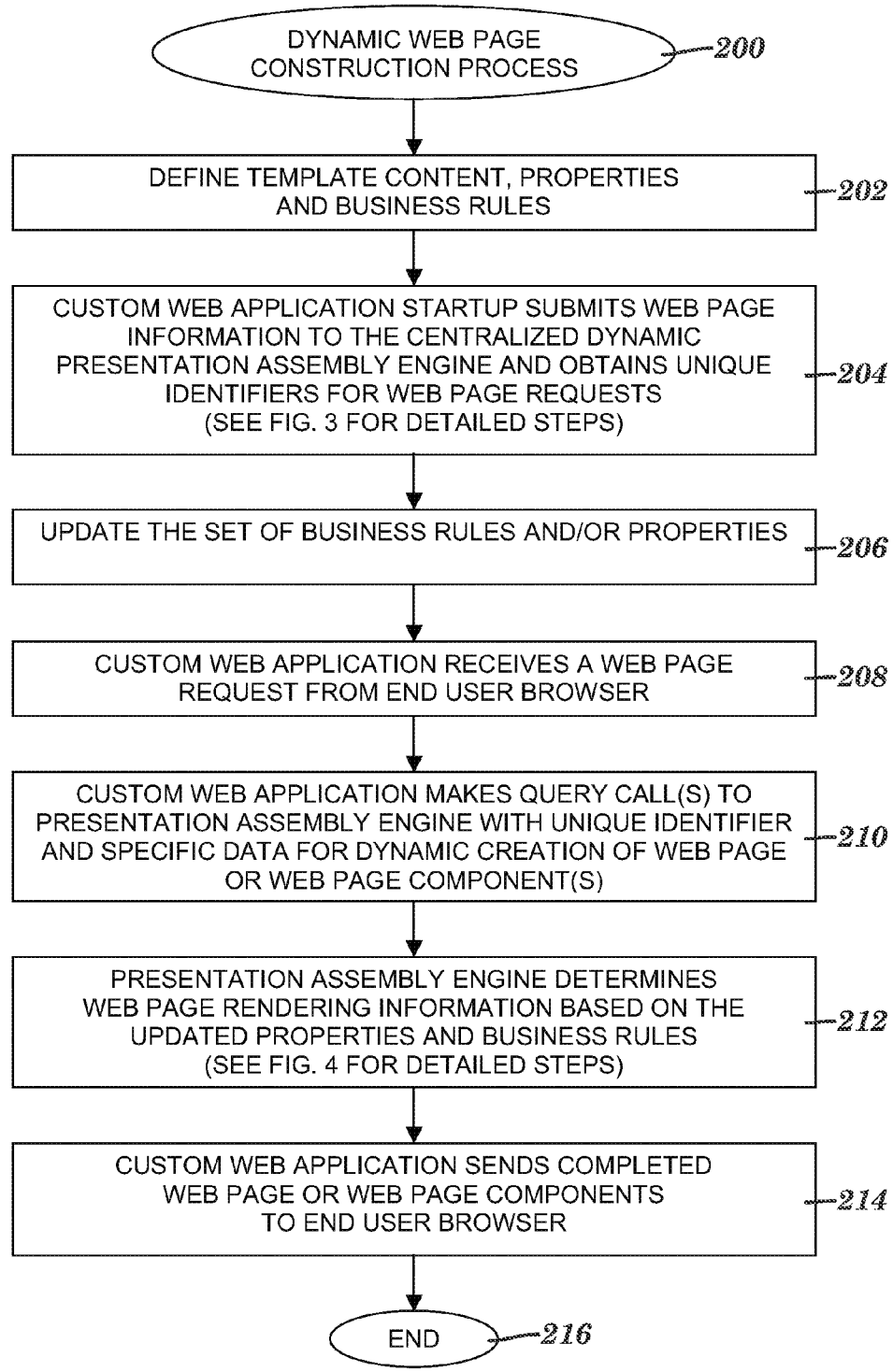
FIG. 2 is a flow chart of a process for dynamically constructing a web page, in accordance with embodiments of the present invention.

FIG. 2 is a flow chart of a process for dynamically constructing a web page, in accordance with embodiments of the present invention. The dynamic web page presentation assembly (a.k.a. dynamic web page construction) process begins at step 200. In step 202, a web designer or UI designer defines standard UI library components (i.e., standardized template content and/or standardized UI components), which are then stored in the standardized UI components and standardized templates database 118 (see FIG. 1). For example, a web designer creates and enters an HTML template for a header of a web page. By entering the header template in this example, a method, getHeaderTemplate( ), is made available for PAE 108 (see FIG. 1) to call to return the HTML for the header. In step 202, the web designer or UI designer also defines business rules and properties, which are stored in databases 110 (see FIG. 1) and 112 (see FIG. 1), respectively.

The standard UI library components, business rules and properties defined in step 202 comprise web page presentation attributes (a.k.a. specifications) to be used to construct web pages associated with any of the multiple custom web applications 102-1, . . . , 102-*n* (see FIG. 1). Subsequent to step 202, PAE 108 (see FIG. 1) determines which of the aforementioned attributes defined in step 202 are available for use by each of the multiple custom web applications 102-1, . . . , 102-*n* (see FIG. 1), thereby exposing specific interfaces, files and variables. PAE 108 (see FIG. 1) assigns to each custom web application the properties and rules that are determined to be available to that custom web application.

In one embodiment, the templates defined in step 202 are configured to include country lookups that provide National Language Support (NLS). As used herein, NLS is defined as the ability for a user to communicate with hardware and software products in a human language of choice to obtain results that are culturally acceptable. In another embodiment, a translation engine is included in system 100 (see FIG. 1) to provide on demand NLS in which templates are requested by any of a plurality of human languages.

In one embodiment, the properties defined in step 202 are defined in XML format by web designers or UI designers and are formulated by the aforementioned methods. The properties provide web page presentation specifications that are available to each custom web application and indicate the locations (e.g., file names) of the presentation attributes.

This centralization and separation of template content, style and page properties from the multiple custom web applications permits "on the fly" changes to properties and rules that result in dynamic look and feel changes to all custom web applications without requiring modifications to the code in each of the web applications. Thus, the dynamic changes to the look and feel of multiple custom web applications need the involvement of only web designers or UI designers who can make the dynamic changes to the properties and rules in a centralized location without the involvement of the multiple web developers who develop and maintain the code of the multiple custom web applications.

Step 204 includes a startup of each of the custom web applications (e.g., custom web application 102-1 of FIG. 1). Each custom web application startup submits web page information to PAE 108 (see FIG. 1) and each custom web application receives unique identifiers for web page requests or actions. This custom web application startup process is described in more detail below relative to FIG. 3.

In step 206, the set of business rules and/or the set of properties defined in step 202 are dynamically updated. For example, the layout of a footer of a requested web page can be changed on the fly in step 206 by changing properties in database 112 (see FIG. 1). As another example, a rule can be dynamically added so that a specified set of properties apply to the footer of a web page if a country code indicates the United Kingdom.

In step 208, a custom web application (e.g., custom web application 102-1 of FIG. 1) receives a web page request or action from browser 104 (see FIG. 1). As used herein, a web page request refers to either a request for a web page or for one or more web page components. The custom web application obtains any specific data that is associated with the particular web page or web page component(s) being requested. The specific data includes, for example, content to be included in the white space of the requested web page or specific application links associated with the requested web page (e.g., links to be associated with the left navigation or right navigation actions).

In step 210, the custom web application that received the web page request in step 208 makes one or more query calls to PAE 108 (see FIG. 1). The query call(s) include the unique identifier for the web page request received in step 208 along with the specific data obtained in step 208. From the list of unique identifiers received in step 204, the custom web application obtains the unique identifier associated with the web page request. The specific data is the data that is to be used in the dynamic assembly of the presentation of the web page or one or more web page components.

In step 212, PAE 108 (see FIG. 1) determines web page assembly (a.k.a. web page rendering) information based on the updated rules and/or updated properties (i.e., according the update in step 206). This web page assembly process is described in more detail below relative to FIG. 4.

In step 214, the custom web application sends a completed web page or completed web page component(s) to the end user's browser. The look and feel of the completed web page or completed web page component(s) is automatically and dynamically determined by the updated rules and properties (see step 206). The dynamic web page construction process ends at step 216. Again, the dynamic changes to the rules and/or properties in databases 110 (see FIG. 1) and 112 (see FIG. 1), respectively, allow for automatic, dynamic changes to the look and feel of web pages requested by multiple custom web applications 102-1, . . . , 102-n (see FIG. 1), without requiring coding changes or additions to any of the custom web applications.

Figure 3:
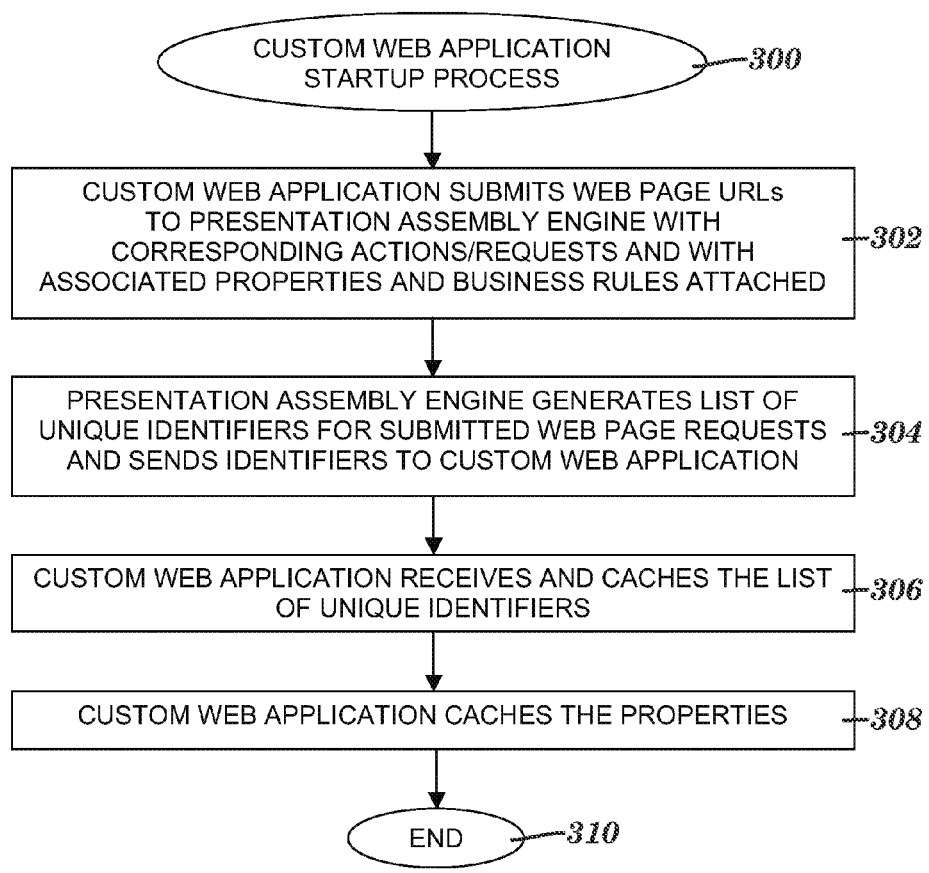
FIG. 3 is a flow chart of a custom web application startup method included in the process of FIG. 2, in accordance with embodiments of the present invention.

FIG. 3 is a flow chart of a custom web application startup method included in the process of FIG. 2, in accordance with embodiments of the present invention. The custom web application startup process starts at step 300. In step 302, the startup of a custom web application (e.g., custom web application 102-1 of FIG. 1) submits to PAE 108 (see FIG. 1) web page information that includes Uniform Resource Locators (URLs) with corresponding actions or requests for all web pages associated with the custom web application whose startup submitted the web page information. From all the properties defined in step 202 (see FIG. 2) and determined by PAE 108 (see FIG. 1) to be available to the custom web application, the custom web application uses a method call or query submission to select a subset of properties (e.g., web page layout specifications) to be associated with a particular web page request. In one embodiment, the custom web application has knowledge of the available and properties via a batch file that obtains rules and determines the applicable properties. If there are modifications or additions to the rules or properties, the batch file notifies the custom web application, so that the custom web application can be updated on the fly.

The selected properties are provided to the PAE, thereby allowing the PAE to format the web page when the web page is requested. After this initial submission of web page information to the PAE, the custom web application avoids any further association with the presentation specifications (i.e., the look and feel) of the web page.

PAE 108 (see FIG. 1) receives the web page information as an identifier request (i.e., a request for a list of unique identifiers). In response to receiving the identifier request, the PAE generates a list of unique identifiers in step 304. The list generated in step 304 uniquely identifies the submitted web page requests or actions, which are associated with the custom web application whose startup submitted the web page information. A different list of unique identifiers is generated for each set of web page information submitted, so that each web page request or action associated with any of the custom web applications (see 102-1, . . . , 102-n of FIG. 1) is uniquely identified. In step 304, PAE 108 (see FIG. 1) sends to each custom web application its associated list of unique identifiers to be used to request the assembly of web page or web page component presentations. In step 306, the custom web application whose startup submitted the web page information in step 204 (see FIG. 2) receives and caches the list of unique identifiers sent in step 304. In step 308, the custom web application caches the properties that the PAE determined were available to that custom web application. The custom web application startup process ends at step 310.

Figure 4:
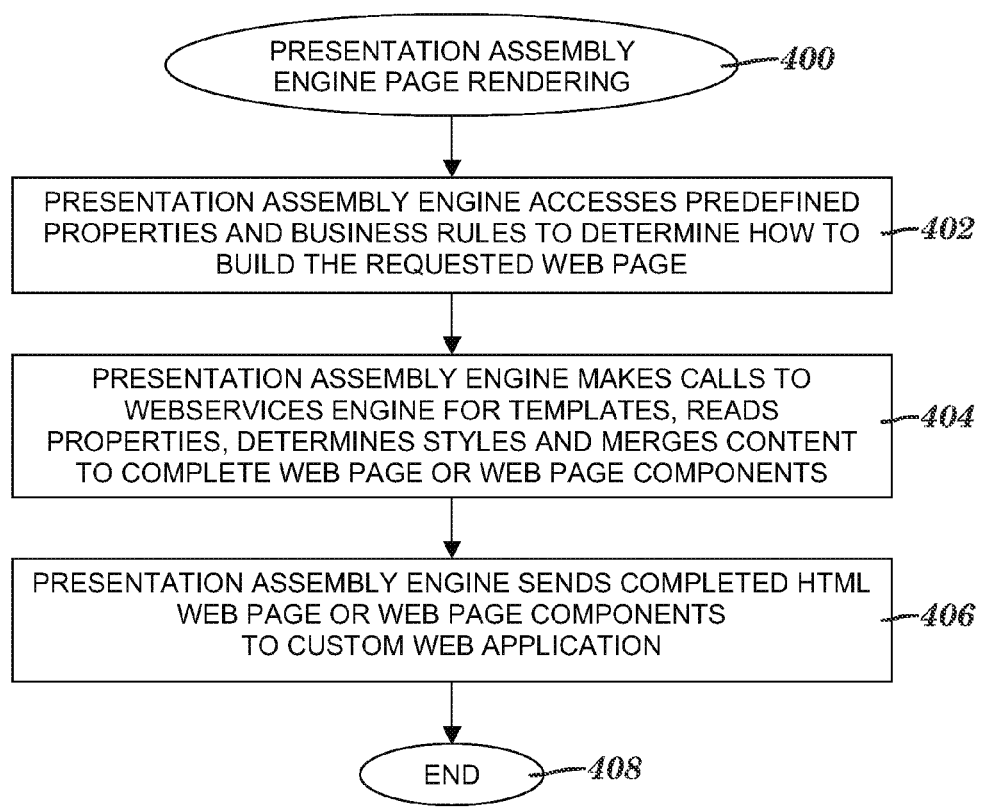
FIG. 4 is a flow chart of a page assembly method included in the process of FIG. 2, in accordance with embodiments of the present invention.

FIG. 4 is a flow chart of a web page assembly method included in the process of FIG. 2, in accordance with embodiments of the present invention. The web page assembly method that employs PAE 108 (see FIG. 1) starts at step 400. In step 402, PAE 108 (see FIG. 1) accesses the predefined business rules and properties (i.e., predefined in step 202 of FIG. 2) to determine how to build the requested web page or requested web page component(s). In step 404, PAE 108 (see FIG. 1) makes requests (i.e., service calls) to web services engine 116 (see FIG. 1) to retrieve standardized UI library components from database 118 (see FIG. 1) that are applicable to the requested web page or the requested web page component(s). Web services engine 116 (see FIG. 1) is implemented to house a plurality of web services for the standardized templates and the standardized UI components so that a request directed to one of the web services returns HTML for a presentation of a web page or web page component(s).

In step 404, the PAE also reads (i.e., retrieves) the properties associated with the requested web page or web page component(s), determines the styles to use in the construction of the web page or web page component(s), and merges the template content with the specific data to assemble a web page or web page component(s). In step 406, PAE 108 (see FIG. 1) sends the assembled HTML web page or HTML web page component(s) to the custom web application. The web page assembly process ends at step 408.

Other Embodiments

In one embodiment, the custom web application's functionality is standardized as a framework, thereby allowing the framework to be reused as an application programming interface (API) for other web applications. This framework separates out the standardization to still another layer, making it possible for a web application to avoid having to implement calls to PAE 108 (see FIG. 1) and to instead use methods that already know how to call and use the PAE.

In another embodiment, the dynamic nature of the present invention is moved to the end user's browser requests (i.e., dynamic changes are allowed via the browser code). In this embodiment, the steps of FIG. 2 are modified so that the browser's request for a web page is sent directly to the PAE (i.e., bypassing the custom web application), where the request triggers the PAE's call to the web services engine to retrieve the appropriate web page or web page component(s).

EXAMPLE

A UI designer defines and enters into database 118 (see FIG. 1) the templates that are used for the assembly of web pages and web page components. FIG. 5 is an example of a template 500 entered at step 202 of FIG. 2. Template 500 is an example of a left navigation template that is called by PAE 108 (see FIG. 1) with the following method call:

getLeftNavTemplate(ArrayList links, int numberOfCurrentSelection); In an upcoming step of the web page construction process (see step 210 of FIG. 2), specific links included in the specific data received from custom web application (CWA) 102-1 (see FIG. 1) are placed into the loop of template 500. Other templates (not shown) are also entered into database 118 (see FIG. 1). For instance, templates for the web page's header, footer and right navigation component are entered in step 202 (see FIG. 2) and related method calls access these templates.

The UI designers also define and enter properties and business rules into databases 112 (see FIG. 1) and database 110 (see FIG. 1), respectively. The properties are defined in XML format. FIG. 6 is an example of template properties 600 that are entered in step 202 of FIG. 2. Properties 600 include specifications related to various types of web page layouts (e.g., one-column, two-column and three-column layouts).

FIG. 7 is an example of web pages 700 submitted by CWA 102-1 (see FIG. 1) to PAE 108 (see FIG. 1) in step 204 (see FIG. 2, see also step 302 of FIG. 3). Pages 700 includes presentation specifications for a Support & Downloads web page (e.g., a TITLE property value of "Support & Downloads" and a LAYOUT property value of "THREE_COLUMN_LAYOUT") and for a Software Tech Notes web page (e.g., a TITLE property value of "Software Tech Notes" and a LAYOUT property value of "ONE_COLUMN_LAYOUT").

FIG. 8 is an example of an XML document 600 having unique identifiers generated by PAE 108 (see FIG. 1) in step 204 of FIG. 2. The identifiers in this example are sent to CWA 102-1 (see FIG. 1) in step 304 (see FIG. 3). In document 600, the identifier "X_123_SUPPORT_DOWNLOAD" identifies the Support & Download web page of FIG. 7 and the identifier "Z_321_SOFTWARE_TECH_NOTES" identifies the Software Tech Notes web page of FIG. 7. Upon receipt of the unique identifiers, the CWA has the capability to request the web pages associated with the unique identifiers and include the specific data of step 210 (see FIG. 2) with the web page request.

The end user makes a web page request of http://www.ibm.com/us/support, which is received and processed by CWA 102-1 (see FIG. 1) in step 208 (see FIG. 2). In step 210, the CWA receives the page request for the Support & Download web page and begins to make query calls to PAE 108 (see FIG. 1). Via these query calls (a.k.a. requests), the CWA requests web page X_123_SUPPORT_DOWNLOAD, passes left navigation links as an array list, passes titles and links for the right navigation as an array list, and passes specific white space content for the requested web page. The CWA also makes sendContent requests along with the page being requested. Furthermore, the CWA makes a receiveContent( ) call to receive the completely assembled web page or web page components. Examples of these step 210 query calls made by the CWA are shown in document 900 of FIG. 9.

In step 212 of FIG. 2, PAE 108 (see FIG. 1) receives the requests from the CWA and constructs the requested page. In this example, the PAE receives the request for page X_123_SUPPORT_DOWNLOAD and looks up the page properties in properties file 112 (see FIG. 1) that had been defined previously by UI designers (see step 402 of FIG. 4). The PAE also knows the page layout and page structure since the CWA submitted these attributes based on UI standards in step 204 (see FIG. 2). With knowledge of the page properties, the page layout and the page structure, the PAE knows all the components needed to format the requested web page. The PAE calls web services engine 116 (see FIG. 1) to retrieve the following templates from database 118 (see FIG. 1): Left Nav Template, Right Nav Template, Page Layout, and Search Template (see step 404 of FIG. 4). The PAE merges the templates together with the application specific data received from the CWA in step 210 (see FIG. 2). The template loops are run to fill in the specific data. The merging of the templates forms a completed web page. The PAE places the completed web page into a queue for retrieval by the CWA in step 406 of FIG. 4. After receiving the completed web page, the CWA sends the completed web page to the end user's browser in step 214 (see FIG. 2).

Computing System

Figure 10:
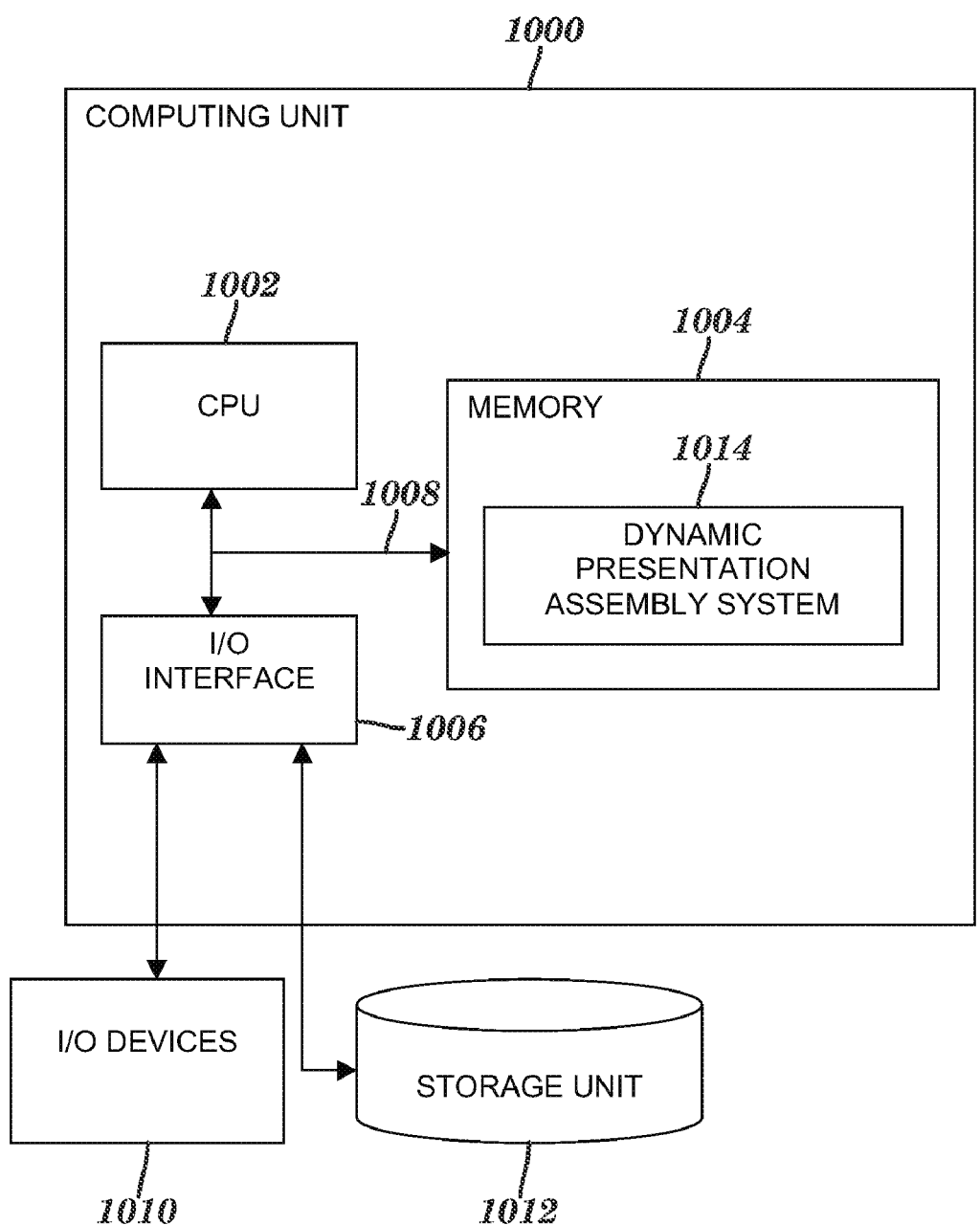
FIG. 10 is a block diagram of a computing system that implements the process of FIG. 2, in accordance with embodiments of the present invention.

FIG. 10 is a block diagram of a computing system that implements the process of FIG. 2, in accordance with embodiments of the present invention. Computing unit 1000 generally comprises a central processing unit (CPU) 1002, a memory 1004, an input/output (I/O) interface 1006, a bus 1008, I/O devices 1010 and a storage unit 1012. CPU 1002 performs computation and control functions of computing unit 1000. CPU 1002 may comprise a single processing unit, or be distributed across one or more processing units in one or more locations (e.g., on a client and server).

Memory 1004 may comprise any known type of data storage and/or transmission media, including bulk storage, magnetic media, optical media, random access memory (RAM), read-only memory (ROM), a data cache, a data object, etc. Cache memory elements of memory 1004 provide temporary storage of at least some program code in order to reduce the number of times code must be retrieved from bulk storage during execution. Moreover, similar to CPU 1002, memory 1004 may reside at a single physical location, comprising one or more types of data storage, or be distributed across a plurality of physical systems in various forms. Further, memory 1004 can include data distributed across, for example, a LAN, WAN or storage area network (SAN) (not shown).

I/O interface 1006 comprises any system for exchanging information to or from an external source. I/O devices 1010 comprise any known type of external device, including a display monitor, keyboard, mouse, printer, speakers, handheld device, printer, facsimile, etc. Bus 1008 provides a communication link between each of the components in computing unit 1000, and may comprise any type of transmission link, including electrical, optical, wireless, etc.

I/O interface 1006 also allows computing unit 1000 to store and retrieve information (e.g., program instructions or data) from an auxiliary storage device 1012. The auxiliary storage device may be a non-volatile storage device such as a magnetic disk drive or an optical disk drive (e.g., a CD-ROM drive which receives a CD-ROM disk). Computing unit 1000 can store and retrieve information from other auxiliary storage devices (not shown), which can include a direct access storage device (DASD) (e.g., hard disk or floppy diskette), a magneto-optical disk drive, a tape drive, or a wireless communication device.

Memory 1004 includes a dynamic presentation assembly system 1014, which implements steps in the process of FIG. 2. Further, memory 1004 may include other systems not shown in FIG. 10, such as an operating system (e.g., Linux) that runs on CPU 1002 and provides control of various components within and/or connected to computing unit 1000.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code of dynamic presentation assembly system 1014 for use by or in connection with a computing unit 1000 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM 1004, ROM, a rigid magnetic disk and an optical disk. Current examples of optical disks include compact disk-read-only memory (CD-ROM), compact disk-read/write (CD-R/W) and DVD.

Any of the components of the present invention can be deployed, managed, serviced, etc. by a service provider that offers to deploy or integrate computing infrastructure with respect to the dynamic web page presentation assembly process of the present invention. Thus, the present invention discloses a process for supporting computer infrastructure, comprising integrating, hosting, maintaining and deploying computer-readable code into a computing system (e.g., computing unit 1000), wherein the code in combination with the computing system is capable of performing a method of dynamically assembling a web page presentation.

In another embodiment, the invention provides a business method that performs the process steps of the invention on a subscription, advertising and/or fee basis. That is, a service provider, such as a Solution Integrator, can offer to create, maintain, support, etc. a process of dynamically assembling a web page presentation of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-based method of dynamically assembling presentations of web pages, said method comprising:

defining a plurality of attributes for facilitating presentations of a plurality of web pages associated with a plurality of custom web applications (CWAs) in a many-to-one correspondence, said plurality of attributes including a plurality of business rules, a plurality of properties and a plurality of standard user interface (UI) library components, wherein said defining is performed without adding code to or modifying code in any custom web application of said plurality of CWAs;

receiving, at a presentation assembly engine (PAE) of a computing system and from a custom web application (CWA) of said plurality of CWAs, a page request for a web page of said plurality of web pages, said page request including a unique identifier associated with said web page, and said page request being initiated by an initial web page request from a browser;

assembling said web page, said assembling performed by said PAE in response to said receiving said page request, said assembling including utilizing said unique identifier to identify one or more attributes of said plurality of attributes, and utilizing said one or more attributes to assemble a presentation of said web page;

receiving an identifier request at said PAE and from said CWA, said receiving said identifier request including receiving a set of one or more Uniform Resource Locators (URLs) for one or more web pages of said plurality of web pages and receiving one or more properties of said plurality of properties and one or more business rules of said plurality of business rules, wherein said one or more web pages are associated with said CWA and include said web page, and wherein said identifier request is initiated by a startup of said CWA;

generating, by said PAE and in response to said receiving said identifier request, one or more unique identifiers associated with said one or more web pages in a one-to-one correspondence, said one or more unique identifiers including said unique identifier; and sending said one or more unique identifiers from said PAE to said CWA.

2. The method of claim 1, further comprising:

updating at least one of: a business rule of said one or more business rules and a property of said one or more properties, wherein said updating is performed without adding code to or modifying code in any custom web application of said plurality of CWAs, and wherein said assembling further includes:

utilizing said unique identifier to identify said web page, utilizing said unique identifier to identify at least one of: said business rule updated by said updating and said property updated by said updating, and utilizing at least one of: said updated business rule and said updated property to assemble said presentation of said web page.

3. The method of claim 1, wherein said receiving said page request includes receiving a set of specific data for facilitating said presentation of said web page, said specific data including at least one of: content for white space of said web page and an application link associated with said web page.

4. The method of claim 3, further comprising:
receiving, from a web services engine, one or more standard UI library components of said plurality of standard UI library components;
merging said one or more standard UI library components with said set of specific data;
assembling, in response to said merging, said presentation of said web page; and
sending said presentation of said web page to said CWA to be forwarded to said browser.

5. The method of claim 4, wherein said receiving said one or more standard UI library components comprises receiving said one or more standard UI library components in HyperText Markup Language.

6. A system including at least one processor for dynamically assembling presentations of web pages in a computing environment, said system comprising:
means for defining a plurality of attributes for facilitating presentations of a plurality of web pages associated with a plurality of custom web applications (CWAs) in a many-to-one correspondence, said plurality of attributes including a plurality of business rules, a plurality of properties and a plurality of standard user interface (UI) library components, wherein said means for defining does not include means for adding code to or means for modifying code in any custom web application of said plurality of CWAs;
means for receiving, at a presentation assembly engine (PAE) of a computing system and from a custom web application (CWA) of said plurality of CWAs, a page request for a web page of said plurality of web pages, said page request including a unique identifier associated with said web page, and said page request being initiated by an initial web page request from a browser;
means for assembling said web page by said PAE in response to said receiving said page request, said means for assembling including means for utilizing said unique identifier to identify one or more attributes of said plurality of attributes, and means for utilizing said one or more attributes to assemble a presentation of said web page;
means for receiving an identifier request at said PAE and from said CWA, said means for receiving said identifier request including means for receiving a set of one or more Uniform Resource Locators (URLs) for one or more web pages of said plurality of web pages and means for receiving one or more properties of said plurality of properties and one or more business rules of said plurality of business rules, wherein said one or more web pages are associated with said CWA and include said web page, and wherein said identifier request is initiated by a startup of said CWA;
means for generating, by said PAE and in response to said receiving said identifier request, one or more unique identifiers associated with said one or more web pages in a one-to-one correspondence, said one or more unique identifiers including said unique identifier; and
means for sending said one or more unique identifiers from said PAE to said CWA.

7. The system of claim 6, further comprising:
means for updating at least one of: a business rule of said one or more business rules and a property of said one or more properties, wherein said means for updating does not include means for adding code to or modifying code in any custom web application of said plurality of CWAs, and
wherein said means for assembling further includes:
means for utilizing said unique identifier to identify said web page,
means for utilizing said unique identifier to identify at least one of: said business rule updated by said updating and said property updated by said updating, and
means for utilizing at least one of: said updated business rule and said updated property to assemble said presentation of said web page.

8. The system of claim 6, wherein said means for receiving said page request includes means for receiving a set of specific data for facilitating said presentation of said web page, said specific data including at least one of: content for white space of said web page and an application link associated with said web page.

9. The system of claim 8, further comprising:
means for receiving, from a web services engine, one or more standard UI library components of said plurality of standard UI library components;
means for merging said one or more standard UI library components with said set of specific data;
means for assembling, in response to said merging, said presentation of said web page; and
means for sending said presentation of said web page to said CWA to be forwarded to said browser.

10. The system of claim 9, wherein said means for receiving said one or more standard UI library components comprises means for receiving said one or more standard UI library components in HyperText Markup Language.

11. A computer program product comprising a computer-readable storage medium including computer-usable program code for dynamically assembling presentations of web pages, said computer-usable program code comprising:
computer-usable code for defining a plurality of attributes for facilitating presentations of a plurality of web pages associated with a plurality of custom web applications (CWAs) in a many-to-one correspondence, said plurality of attributes including a plurality of business rules, a plurality of properties and a plurality of standard user interface (UI) library components, wherein said computer-usable code for defining does not include computer-usable code for adding code to or modifying code in any custom web application of said plurality of CWAs;
computer-usable code for receiving, at a presentation assembly engine (PAE) of a computing system and from a custom web application (CWA) of said plurality of CWAs, a page request for a web page of said plurality of web pages, said page request including a unique identifier associated with said web page, and said page request being initiated by an initial web page request from a browser;
computer-usable code for assembling said web page by said PAE and in response to said receiving said page request, said computer-usable code for assembling including computer-usable code for utilizing said unique identifier to identify one or more attributes of said plurality of attributes, and computer-usable code for utilizing said one or more attributes to assemble a presentation of said web page;
computer-usable code for receiving an identifier request at said PAE and from said CWA, said computer-usable code for receiving said identifier request including computer-usable code for receiving a set of one or more Uniform Resource Locators (URLs) for one or more web pages of said plurality of web pages and computer-usable code for receiving one or more properties of said plurality of properties and one or more business rules of said plurality of business rules, wherein said one or more web pages are associated with said CWA and include said web page, and wherein said identifier request is initiated by a startup of said CWA;

computer-usable code for generating, by said PAE and in response to said receiving said identifier request, one or more unique identifiers associated with said one or more web pages in a one-to-one correspondence, said one or more unique identifiers including said unique identifier; and computer-usable code for sending said one or more unique identifiers from said PAE to said CWA.

12. The program product of claim 11, further comprising:

computer-usable code for updating at least one of: a business rule of said one or more business rules and a property of said one or more properties, wherein said computer-usable code for updating does not include code added to or code modified in any custom web application of said plurality of CWAs, and wherein said computer-usable code for assembling further includes:

computer-usable code for utilizing said unique identifier to identify said web page, computer-usable code for utilizing said unique identifier to identify at least one of: said business rule updated by said updating and said property updated by said updating, and computer-usable code for utilizing at least one of: said updated business rule and said updated property to assemble said presentation of said web page.

13. The program product of claim 11, wherein said computer-usable code for receiving said page request includes computer-usable code for receiving a set of specific data for facilitating said presentation of said web page, said specific data including at least one of: content for white space of said web page and an application link associated with said web page.

14. The program product of claim 13, further comprising:

computer-usable code for receiving, from a web services engine, one or more standard UI library components of said plurality of standard UI library components;

computer-usable code for merging said one or more standard UI library components with said set of specific data; computer-usable code for assembling, in response to said merging, said presentation of said web page; and computer-usable code for sending said presentation of said web page to said CWA to be forwarded to said browser.

15. A process for supporting computing infrastructure, said process comprising providing at least one support service for at least one of creating, integrating, hosting, maintaining, and deploying computer-readable code in a computing system, wherein the code in combination with the computing system is capable of performing a method of dynamically assembling presentations of web pages, said method comprising:

defining a plurality of attributes for facilitating presentations of a plurality of web pages associated with a plurality of custom web applications (CWAs) in a many-to-one correspondence, said plurality of attributes including a plurality of business rules, a plurality of properties and a plurality of standard user interface (UI) library components, wherein said defining is performed without adding code to or modifying code in any custom web application of said plurality of CWAs;

receiving, at a presentation assembly engine (PAE) of a computing system and from a custom web application (CWA) of said plurality of CWAs, a page request for a web page of said plurality of web pages, said page request including a unique identifier associated with said web page, and said page request being initiated by an initial web page request from a browser;

assembling said web page, said assembling performed by said PAE in response to said receiving said page request, said assembling including utilizing said unique identifier to identify one or more attributes of said plurality of attributes, and utilizing said one or more attributes to assemble a presentation of said web page;

receiving an identifier request at said PAE and from said CWA, said receiving said identifier request including receiving a set of one or more Uniform Resource Locators (URLs) for one or more web pages of said plurality of web pages and receiving one or more properties of said plurality of properties and one or more business rules of said plurality of business rules, wherein said one or more web pages are associated with said CWA and include said web page, and wherein said identifier request is initiated by a startup of said CWA;

generating, by said PAE and in response to said receiving said identifier request, one or more unique identifiers associated with said one or more web pages in a one-to-one correspondence, said one or more unique identifiers including said unique identifier; and sending said one or more unique identifiers from said PAE to said CWA.

16. The process of claim 15, wherein said method further comprises:

updating at least one of: a business rule of said one or more business rules and a property of said one or more properties, wherein said updating is performed without adding code to or modifying code in any custom web application of said plurality of CWAs, and wherein said assembling further includes:

utilizing said unique identifier to identify said web page, utilizing said unique identifier to identify at least one of: said business rule updated by said updating and said property updated by said updating, and utilizing at least one of: said updated business rule and said updated property to assemble said presentation of said web page.

* * * * *